No. 789,972. PATENTED MAY 16, 1905.
C. A. HARTMANN.
STOP FOR CUT-OFF SAWS.
APPLICATION FILED AUG. 20, 1904.
2 SHEETS—SHEET 1.
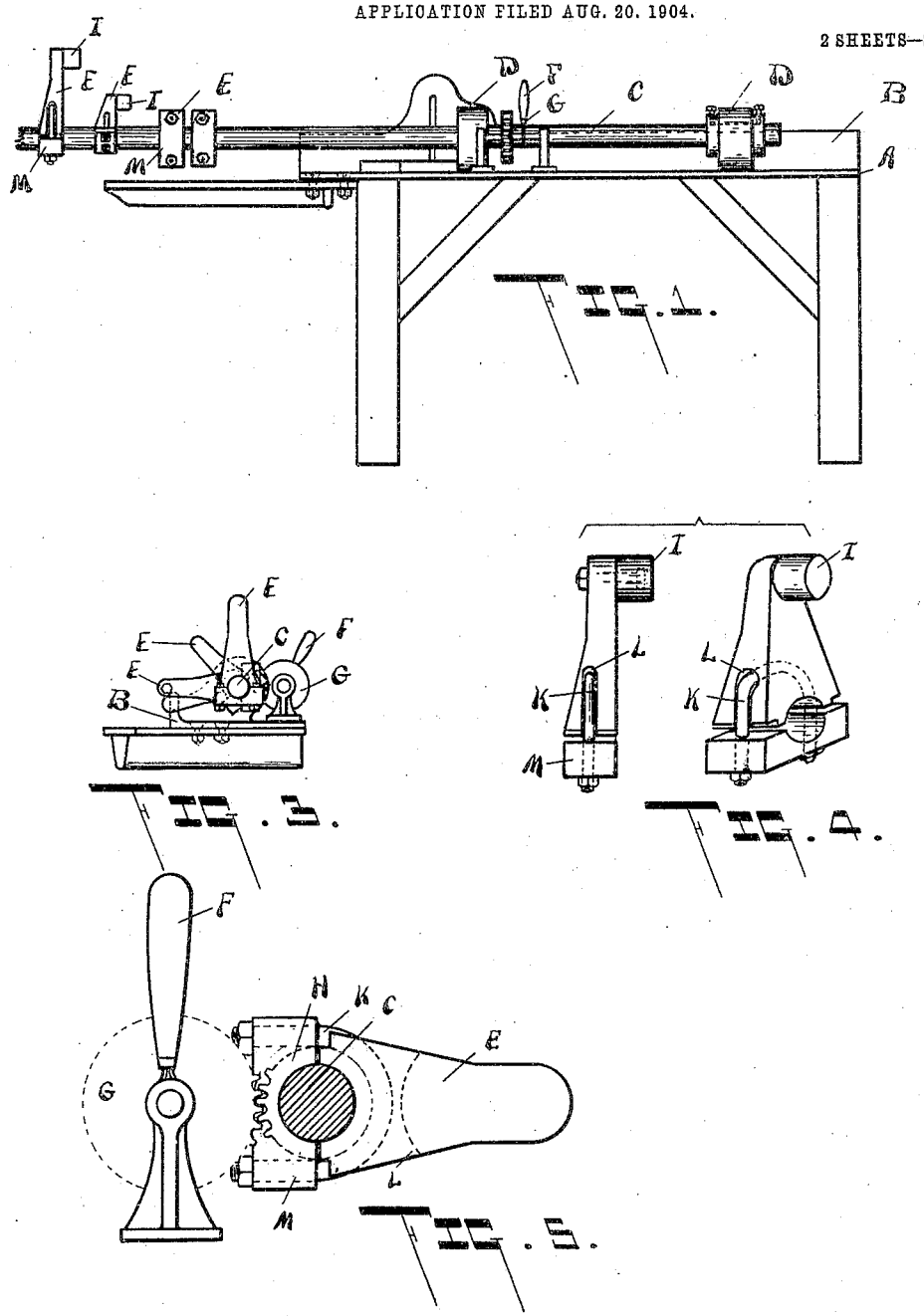
WITNESSES:
W. I. Cathcart.
John R Mansfield.
Charles A. Hartmann INVENTOR
BY
Geo. B. Willcox ATTORNEY

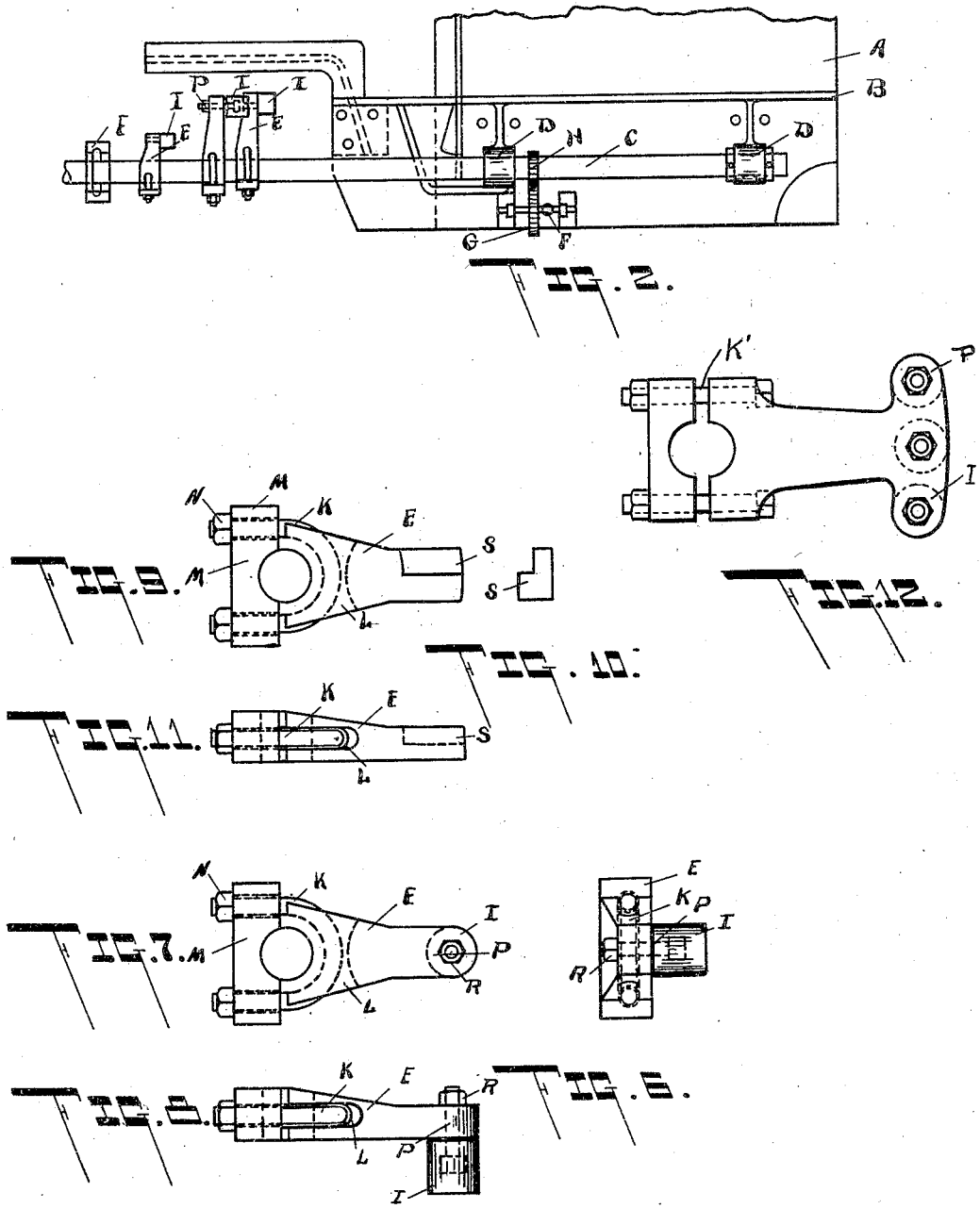

No. 789,972.

Patented May 16, 1905.

UNITED STATES PATENT OFFICE.

CHARLES A. HARTMANN, OF HOQUIAM, WASHINGTON.

STOP FOR CUT-OFF SAWS.

SPECIFICATION forming part of Letters Patent No. 789,972, dated May 16, 1905.

Application filed August 20, 1904. Serial No. 221,571.

*To all whom it may concern:*

Be it known that I, CHARLES A. HARTMANN, a citizen of the United States, residing at Hoquiam, in the county of Chehalis and State of Washington, have invented certain new and useful Improvements in Stops for Cut-Off Saws; and I do hereby declare the following to be a full, clear, and exact description of the invention, such as will enable others skilled in the art to which it appertains to make and use the same.

My invention relates to improvements in stops used to regulate the length of lumber or timber sawed on any form of trimmer, cut-off saw, or other machine in which stops are used to determine the length of the piece cut off; and the objects of my improvement are to obtain a series of accurate measurements for cutting lumber to exact lengths and to be able to use any of the said series of accurate measurements without readjusting the stops. I attain these objects by the mechanism illustrated in the accompanying drawings, in which—

Figure 1 is a side elevation of a machine, showing the stop in position. Fig. 2 is a plan view of the machine. Fig. 3 is an end elevation of the rocker-shaft and arms. Fig. 4 is a side view and perspective view of one of the arms, showing the stop. Fig. 5 shows the mechanism used to rotate the rocker-shaft. Fig. 6 is a rear end view of an arm. Figs. 7 and 8 are respectively front and side views of the same. Figs. 9, 10, and 11 are respectively front, end, and side views of a modified form of arm. Fig. 12 shows another modified form.

The machine consists of the usual table A, upon which the lumber to be cut off is laid, together with a back-stop B, against which the lumber rests while being sawed. Behind and beyond this table is a horizontal shaft C, supported in suitable bearings D and carrying any suitable number of arms E, clamped radially at different angles. The arms carry the means for fixing the length of the pieces to be cut. Shaft C is a rocking shaft and may be rotated by a lever F through gears G and H or by a lever attached direct to the rocking shaft or by other suitable means. The advantage derived from using the lever-and-gear motion is that by a small movement of lever F a relatively large movement of rocker-shaft C is obtained. Any of the radial arms E by being brought into line with the lumber act as stops, and any one of these stops may be brought into line by rotating the rocking shaft. When so placed, the arm acts as a bumper, against which the end of the lumber is shoved and held while being cut.

The radial arms E are preferably made of cast metal, and each is clamped to the aforesaid rocking shaft C by means of a U-shaped bolt K passed through a cored slot L in the arm E, the bolt K passing around the rocking shaft C and through cap M, the arm and cap being secured in place by bolt K and nuts N or by ordinary bolts K', as shown in Fig. 12. The arms may be of any suitable length and are preferably of the general design shown in Fig. 4. This construction produces an arm that can be assembled cheaply without expensive machine-work.

On the end of each arm E is fastened one or more stop-blocks I, as shown in Figs. 7 and 12, which are varied in length in a direction parallel to the rocking shaft C by sawing off the ends of the blocks. The stop-blocks are preferably made circular in cross-section and of any desired length. A bolt P is sunk axially into the block I, so that the head of the bolt is embedded in the block. The other end of the bolt P is passed through a hole in the end of the arm E, and said bolt is secured in place by a lock-nut R, set up against the face of the arm E. Adjustment of the stop-block I may be made by sawing off the end of the block.

A modification of the stop-block I is shown in Figs. 9, 10, and 11. It consists of any suitable number of steps or offsets S, formed in the end of the arm, thereby securing a number of adjustments by a slight movement of the rocker-shaft C.

Any suitable number of these arms with stop-blocks may be put on the rocker-shaft and set at different angles, so that by rotating the rocker-shaft any one of them may be brought into line with the lumber and the others be moved out of the way. Without the use of these stop-blocks finer adjustment than the thickness of the arms cannot be made; but by using the stops and making them overlap the next arm in front any required adjustment can easily be secured.

Various slight changes might be made in the details of construction of my invention without departing from the spirit thereof or limiting its scope, and hence I do not wish to limit myself to the precise details herein set forth.

What I claim as my invention, and desire to secure by Letters Patent, is—

1. In a cut-off machine, the combination with a rocker-shaft bearing a plurality of arms, said arms being secured to said rocker-shaft at different angles; of stops on the ends of said arms; said stops being of variable length in a direction parallel to said rocker-shaft.

2. In a cut-off machine, the combination with a rocker-shaft bearing a plurality of angularly-adjustable arms, said arms being secured to said rocker-shaft at different angles; and of stops on the ends of said arms; said stops being of variable length in a direction parallel to said rocker-shaft.

3. In a cut-off machine, the combination with a rocker-shaft bearing a plurality of angularly-adjustable arms, said arms being secured to said rocker-shaft at different angles; of stops on the ends of said arms; said stops to be circular in cross-section and of a length sufficient to overlap the next succeeding arm or arms; said stop being of variable length in a direction parallel to said rocker-shaft.

In testimony whereof I affix my signature in presence of two witnesses.

CHARLES A. HARTMANN.

Witnesses:
 R. E. DAWDY,
 WILHELM JENSEN.